United States Patent
Kasahara et al.

(10) Patent No.: US 7,348,753 B2
(45) Date of Patent: Mar. 25, 2008

(54) FAN MOTOR

(75) Inventors: Takashi Kasahara, Fukushima-ken (JP); Hiroyuki Shingai, Fukushima-ken (JP); Masaaki Takagi, Fukushima-ken (JP)

(73) Assignee: NIDEC Copal Corporation, Tokyo (JP)

( * ) Notice: Subject to any disclaimer, the term of this patent is extended or adjusted under 35 U.S.C. 154(b) by 231 days.

(21) Appl. No.: 10/808,356

(22) Filed: Mar. 25, 2004

(65) Prior Publication Data

US 2004/0189238 A1    Sep. 30, 2004

(30) Foreign Application Priority Data

Mar. 27, 2003  (JP) ............................ P.2003-088602

(51) Int. Cl.
*H02P 8/00* (2006.01)

(52) U.S. Cl. ...................................... 318/696; 318/685

(58) Field of Classification Search ............ None
See application file for complete search history.

(56) References Cited

U.S. PATENT DOCUMENTS

| | | | | |
|---|---|---|---|---|
| 4,206,719 A | * | 6/1980 | Faris ........................... | 119/259 |
| 4,734,604 A | * | 3/1988 | Sontheimer et al. .......... | 310/76 |
| 4,962,734 A | * | 10/1990 | Jorgensen ................ | 123/41.49 |
| 5,015,903 A | * | 5/1991 | Hancock et al. ............ | 310/168 |
| 5,650,697 A | * | 7/1997 | Imagi et al. ................ | 318/254 |
| 6,051,952 A | * | 4/2000 | Moreira et al. ............. | 318/738 |
| 6,147,465 A | * | 11/2000 | Hollenbeck ................. | 318/254 |
| 6,589,018 B2 | * | 7/2003 | Chen ........................... | 417/14 |
| 6,900,574 B2 | * | 5/2005 | Takemoto et al. .......... | 310/254 |
| 2002/0178706 A1 | | 12/2002 | Kvietok et al. | |
| 2003/0098660 A1 | * | 5/2003 | Erdman et al. ............. | 318/254 |
| 2003/0209343 A1 | * | 11/2003 | Bingler ...................... | 165/80.4 |

FOREIGN PATENT DOCUMENTS

| | | |
|---|---|---|
| JP | 61-11390 | 4/1986 |
| JP | 2-100631 | 8/1990 |
| JP | 3-154613 | 7/1991 |
| JP | 4-246043 | 9/1992 |
| JP | 5-153892 | 6/1993 |
| JP | 6-235777 | 8/1994 |
| JP | 8-47299 | 2/1996 |
| JP | 8-255859 | 10/1996 |

(Continued)

OTHER PUBLICATIONS

Korean Office Action dated May 17, 2007 with partial English translation.

*Primary Examiner*—Lincoln Donovan
*Assistant Examiner*—Renata McCloud
(74) *Attorney, Agent, or Firm*—McGinn IP Law Group, PLLC

(57) ABSTRACT

A fan motor includes: a single-phase stepping motor including a stator excited by applying an electric current to a coil to function as a single-phase magnetic pole, and a rotor which has a permanent magnet magnetized to a single phase and rotates as the magnetic pole of the stator changes; an impeller which is rotated by a rotating shaft of the rotor; and a drive circuit for controlling an application of a current to the coil. The drive circuit applies pulse voltage to the coil and the coil constant is set so that a mean value of the current applied to the coil is 10 mA or smaller.

13 Claims, 6 Drawing Sheets

FOREIGN PATENT DOCUMENTS

| | | |
|---|---|---|
| JP | 10-5622 | 1/1998 |
| JP | 10-136634 | 5/1998 |
| JP | 11-197438 | 7/1999 |
| JP | 2000-513070 | 10/2000 |
| JP | 2003-47222 | 2/2003 |
| WO | WO 200213357 A1 * | 2/2002 |

* cited by examiner

FAN MOTOR

BACKGROUND OF THE INVENTION

The present invention relates to a fan motor for use in a dehumidifier, an insect repeller and so on, which fan motor is designed to realize low current, low noise and a long life.

Heretofore, there have been proposed electric fans for use in dehumidifiers (refer to Patent Documents 1 to 3, and 8, for example); however, no consideration has been given to driving electric motors by batteries and consequently these related arts are not intended to realize low current, low noise and a long life.

In the meantime, in order to reduce the power consumption of the fan motor lower, such a device is proposed which performs control over suppressing the power consumption by detecting the effect of the fan motor so as to control (decrease) the number of revolutions of the fan motor according to the extent of the effect or to intermittently drive the fan motor (refer to Patent Document 4, for example), and, for another example, which arranges the fan motor to have a single blade, using a piezo-electric element (refer to Patent Document 5, for example).

However, in case that the fan motor is arranged to have such a single blade, it will tend to become expensive because a booster circuit is required.

Although single-phase stepping motors for use in timepieces are well known as motors of a low power consumption type (e.g., Patent Documents 6 and 9), these motors are hardly applicable to fan motors as their torque is very small.

Moreover, a fan motor with a stepping motor as a drive source has been proposed by Patent Document 7; however, moment of inertia of an impeller is large at low-current driving and this makes the low-current driving infeasible as a failure to start the fan motor occurs in an out-of-phase condition.

Patent Documents 2 and 3 disclose arrangements of fan receiving portions mounted to motor shafts such that fans are driven by friction between the fans and the fan receiving portions and the arrangements are intended to stop the fans even during the rotation of the motors when equipment is skewed. However, the center of gravity of the fan may deviate from the motor shaft because a gap is radially formed between the motor shaft and the fan, which results in not only deteriorating the balance but also causing vibration and noise.

Patent Document 1
  JP-UM-A-2-100631

Patent Document 2
  JP-A-3-154613

Patent Document 3
  JP-A-11-197438

Patent Document 4
  JP-A-10-5622

Patent Document 5
  JP-T-2000-513070

Patent Document 6
  JP-B-61-11390

Patent Document 7
  JP-A-10-136634

Patent Document 8
  JP-A-5-153892

Patent Document 9
  JP-A-8-255859

Under the circumstances above, a no-load current of several milliamperes has heretofore been obtained by using a DC motor with a brush in which the resistance value of a rotor is increased. The brush tends to wear down as the driving of the motor continues for many hours and a problem concerning the life of the motor is developed. Therefore, it is conceivable to use a brushless motor without any contact like the brush in order to increase the life of the motor, but only the Hall element of the brushless motor requires at least several milliamperes and the current consumption will amount to several tens of milliamperes if supply of power to other components such as a drive circuit in addition to the motor is needed. Thus, continuous driving for a prolonged time by means of a battery is hardly possible.

In the case that a sensorless motor which does not have a Hall element is employed, moreover, the starting characteristics have to be high as counter electromotive force of the coil is detected, which results in making it difficult to attain lower power consumption, thereby the expenses will run up. In the case that a stepping motor without requiring such a Hall element is used, low current driving becomes possible; however, attempting to driving an impeller having a large moment of inertia causes a failure to start and an out-of-phase condition to occur because starting torque is small and the low current driving is made difficult thereby.

SUMMARY OF THE INVENTION

An object of the invention made in view of the foregoing problems is to provide a fan motor capable of driving an impeller to rotate with low current, low noise and a long life.

In order to solve the aforesaid object, the invention is characterized by having the following arrangement.

(1) A Fan Motor Comprising:
  a single-phase stepping motor including a stator excited by applying an electric current to a coil to function as a single-phase magnetic pole, and a rotor which has a permanent magnet magnetized to a single phase and rotates as the magnetic pole of the stator changes;
  an impeller which is rotated by a rotating shaft of the rotor; and
  a drive circuit for controlling an application of a current to the coil,
  wherein the drive circuit applies pulse voltage to the coil and the coil constant is set so that a mean value of the current applied to the coil is 10 mA or smaller.

(2) The fan motor according to (1), wherein the drive circuit includes CMOS transistors.

(3) The fan motor according to (1), wherein a timepiece IC is used as the drive circuit.

(4) A fan motor according to (1), wherein a pulse frequency which is output from the drive circuit at a time of starting is set lower than the pulse frequency during a steady operation.

(5) A fan motor according to (1), further comprising a coupling mechanism which couples the impeller to the rotating shaft relatively and rotatably, wherein the coupling mechanism couples the impeller slidably to the rotating shaft of the rotor; causes the rotating shaft to race with respect to the impeller at the time of starting the motor; and causes the impeller to rotate by following the rotation of the rotating shaft by friction during the steady operation.

(6) The fan motor according to (1), further comprising a coupling mechanism which couples the impeller to the rotating shaft relatively and rotatably, wherein the coupling mechanism couples the impeller slidably to the rotating shaft of the rotor; includes a permanent magnet for attracting the impeller so as to contact the impeller against the rotating shaft of the rotor with a predetermined holding-down force; causes the rotating shaft to race with respect to the impeller at the time of starting the motor; and causes the impeller to rotate by following the rotation of the rotating shaft during the steady operation.

DETAILED DESCRIPTION OF PREFERRED EMBODIMENTS

The preferred embodiment of the invention will now be described by reference to the accompanied drawings.

Incidentally, the embodiment of the invention as described below refers to an example for implementing the invention and the invention may include modifications or variations thereof unless departing from the spirit thereof.

Figure 1:
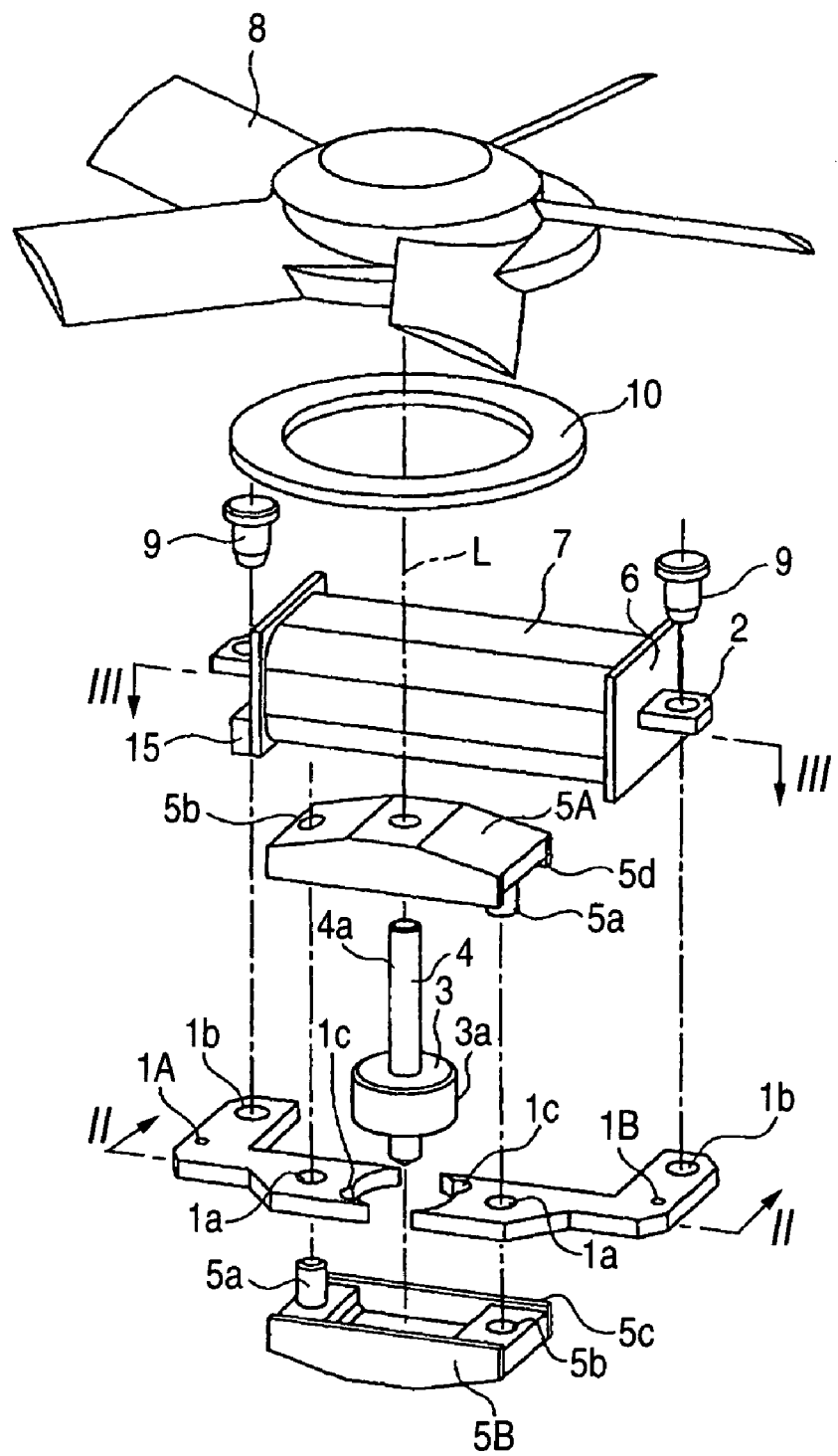
FIG. 1 is an exploded perspective view of a fan motor according to an embodiment of the invention.
Figure 2:
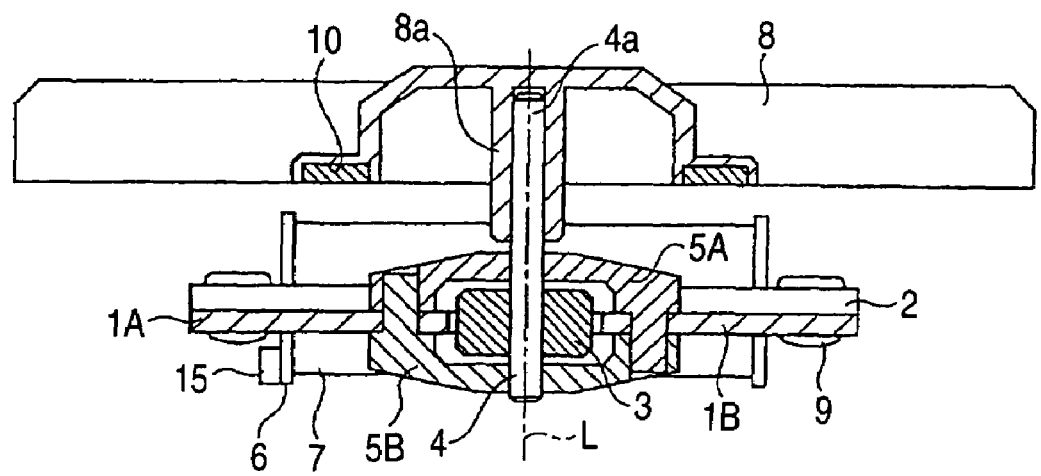
FIG. 2 is a sectional view taken on line II-II of FIG. 1 illustrating the assembled fan motor.

FIG. 1 is an exploded perspective view of a fan motor according to the embodiment of the invention; FIG. 2, a sectional view taken on line II-II of FIG. 1 illustrating the assembled fan motor.

As shown in FIGS. 1 and 2, the fan motor according to this embodiment of the invention is constituted such that an impeller 8 having a plurality of rotor blades like an axial-flow fan or a sirocco fan is connected to an output shaft 4 of a single-phase stepping motor.

In the single-phase stepping motor, a cylindrical permanent magnet (rotor magnet) 3 magnetized in a single phase (two poles in the diameter direction) forms a rotor fixed to the output shaft 4. The output shaft 4 is rotatably supported by a pair of bearing members 5A and 5B axially joined together.

A pair of thin magnetic boards as stator yokes 1A and 1B are provided such that these yokes are held between the pair of bearing members 5A and 5B. Each of the stator yokes 1A and 1B forms a stator excited by applying an electric current to a coil 7 to function as a single-phase magnetic pole (S or N pole).

The pair of stator yokes 1A and 1B are formed of magnetically symmetrical L-shaped magnetic material (e.g., metal) and arranged symmetrically with respect to the rotating shaft L of the output shaft 4. One end portions functioning as magnetic poles of the respective stator yokes 1A and 1B are hollowed out in the form of an arc corresponding to an arc of a circle forming the outer peripheral portion 3a of the rotor magnet 3. Further, positioning holes 1a are provided near the magnetic poles of the stator yokes 1A and 1B.

Each bearing member 5A and 5B is formed with projected portions 5a and holes 5b. The projected portion 5a of the bearing member 5A on one (upper) side is fitted into the hole 5b of the bearing member 5B on the other (lower) side whereby to fix both the members. When the bearing members 5A and 5B are fixed, the one end portions (magnetic poles) of the stator yokes 1A and 1B can accurately be positioned face to face with a predetermined gap held against the outer peripheral portion 3a of the rotor magnet 3 by passing the projected portions 5a through the positioning holes 1a of the stator yokes 1A and 1B.

A guide face 5c is provided on the side edge portion in the major axis direction of the other-side bearing member 5B and the corresponding side edge portion 5d of the one-side bearing member 5B is contacted against the guide face 5c, whereby the space between the rotor magnet 3 and the stator yokes 1A and 1B is kept at a desired distance with the effect of obviating the positional deviation of the bearing members 5A and 5B from each other and also suppressing the play between the rotor magnet 3 and the stator yokes 1A and 1B.

Fitting holes 1b are formed in the other ends of the stator yokes 1A and 1B so that opposite end portions of a coil yoke 2 are magnetically and mechanically coupled to the stator yokes 1A and 1B with a rivet 9 or the like The coil yoke 2 formed of magnetic material is passed through the central axis of the coil 7 wound on a bobbin 6 and excited by applying the current to the coil 7 to function as the single-phase magnetic pole (S or N pole) in the one end portions of the stator yokes 1A and 1B.

Figure 6:
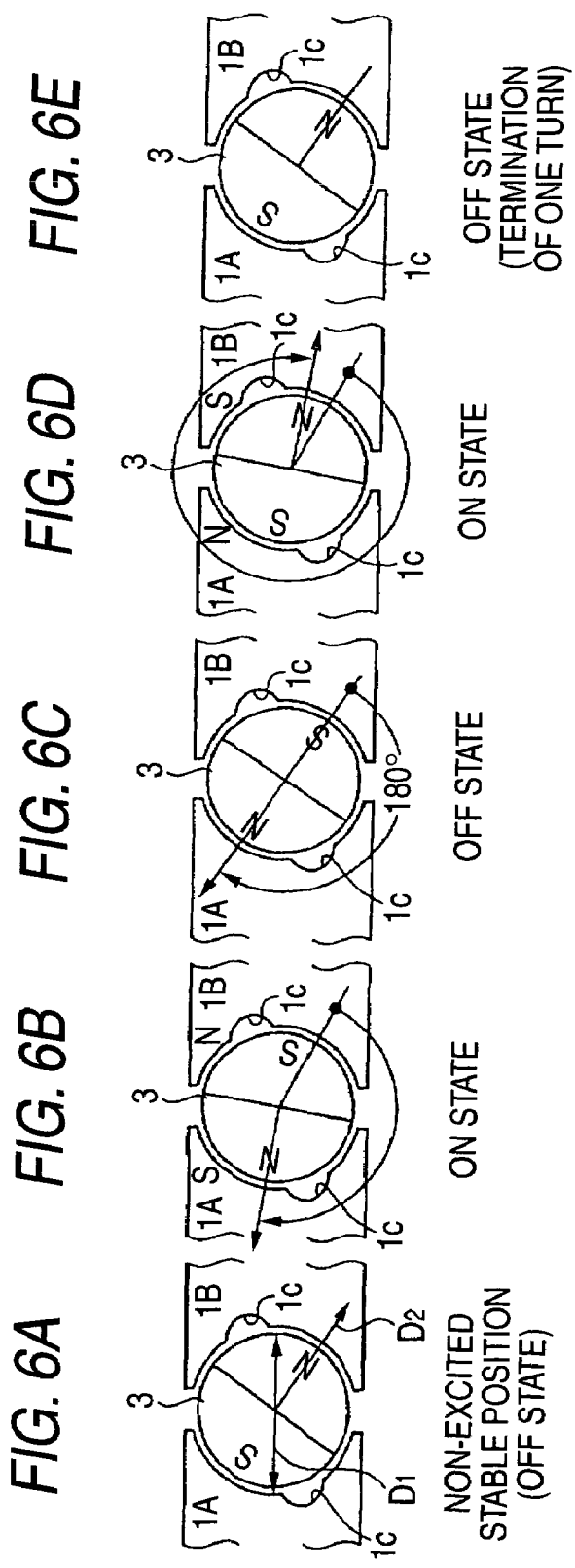
FIGS. 6A to 6E are diagrams illustrating the rotating operating of the stepping motor according to this embodiment of the invention.

A terminal 15 for electrically connecting a drive circuit which will be described later to the coil 7 is mounted to the bobbin 6. The one end portions of the stator yokes 1A and 1B are formed into magnetic poles when the current is applied to the coil 7 so as to excite the coil yoke 2, and the rotor magnet 3 is rotated by inverting the magnetic poles, Cutout portions 1c are formed in the one end portions which are the magnetic poles of the stator yokes 1A and 1B. These cutout portions 1c make unequal the space between the one end portions (magnetic poles) of the stator yokes 1A and 1B and the outer peripheral portion 3a of the rotor magnet 3 whereby to form an electromagnetically stable position of the rotor magnet 3 and a non-excited stable position thereof, so that the rotation of the rotor magnet 3 is made possible by self-starting (see FIG. 6).

More specifically, on receiving cogging torque from the magnetic poles of the stator yokes 1A and 18, the magnetic poles of the rotor magnet 3 in the non-excited stable position are in such a positional relation that the direction D1 (see FIGS. 6A to 6E) of magnetic flux generated between the stator yokes 1A and 1B at the time of excitation crosses and deviates from, the polarity direction D2 of the rotor magnet 3 (both of them being not parallel) (see FIGS. 6A, 6C and 6E).

In the electromagnetically stable position, the magnetic poles of the rotor magnet 3 are subjected to attraction force and repulsion force from the magnetic poles of the stator yokes 1A and 1B to be balanced and then the-polarity of the rotor magnet 3 is in such a positional relation that the polarity thereof is inverted by less than 180° from the non-excited stable position (see FIGS. 6B and 6D).

The output shaft 4 is slidably (capable of racing) inserted into a shaft hole 8a provided on the central axis of rotation of the impeller 8. The front end portion 4a of the output shaft 4 thus inserted into the impeller 8 is in a spherical form and contacted against the base portion of the shaft hole 8a of the impeller 8. A permanent magnet in the form of a thin ring plate as a holding member 10 is fixed coaxially with the output shaft 4 to the underside of the impeller 8 opposite to the stator yokes 1A and 1B When the holding member 10 is attracted by magnetic force toward the stator yokes 1A and 1B, the front end portion 4a of the output shaft 4 is contacted against the base portion of the shaft hole 8a of the impeller 8 with a predetermined holding-down force. The holding member 10 should be as small in diameter and thin as possible in order to minimize moment of inertia.

With this coupling mechanism, the output shaft 4 slides (races) against the shaft hole 8a of the impeller 8 at the time of starting the stepping motor and then the impeller 8 is caused to gradually follow the rotation of the output shaft 4 by the frictional force between the front end portion 4a of the output shaft 4 and the shaft hole 8a of the impeller 8 toward the steady operation thereafter.

Therefore, even in case that the motor is difficult to start because the moment of inertia of the impeller is large or the moment of inertia of the impeller is so large as to make the motor assume an out-of-phase condition at the time the motor is started as in the conventional arrangement wherein the impeller is fixedly coupled to the output shaft, what has a large moment of inertia like the impeller can be driven to rotate by using the stepping motor that requires small starting torque. Consequently, no out-of-phase condition is produced at the time of starting, so that driving with low current, low noise and a long life becomes feasible.

Figure 3:
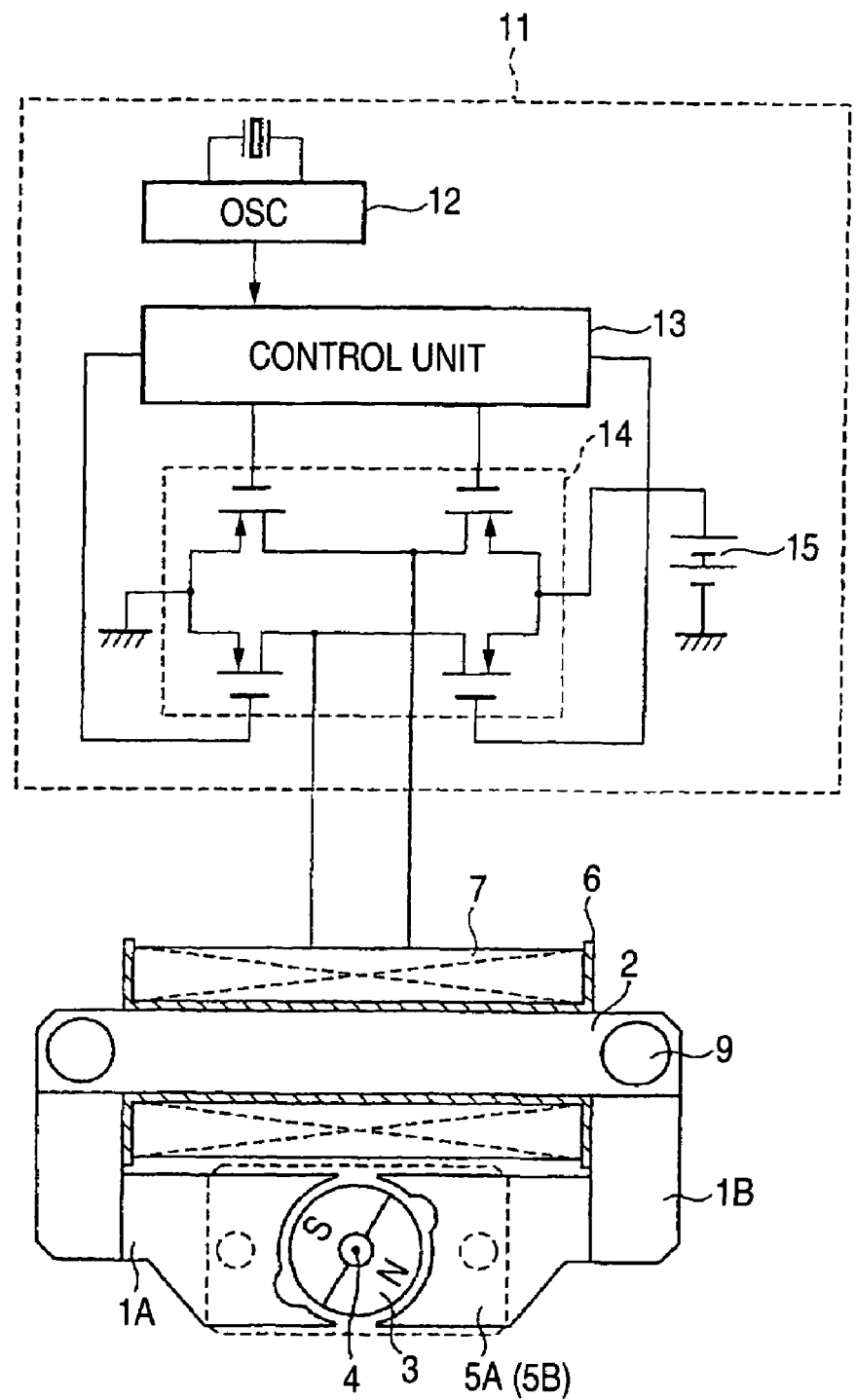
FIG. 3 is a block diagram of a drive circuit according to this embodiment of the invention with a sectional view taken on line III-III of FIG. 1 illustrating the assembled fan motor.

FIG. 3 is a block diagram of a drive circuit according to this embodiment of the invention with a sectional view taken along line III-III of FIG. 1 illustrating the assembled fan motor.

Figure 4:
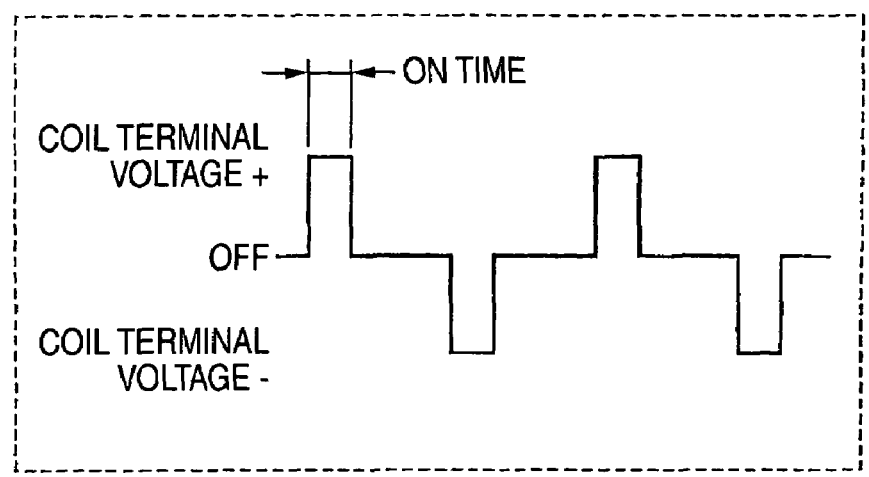
FIG. 4 is a waveform chart showing a voltage waveform for driving a stepping motor.
Figure 5:
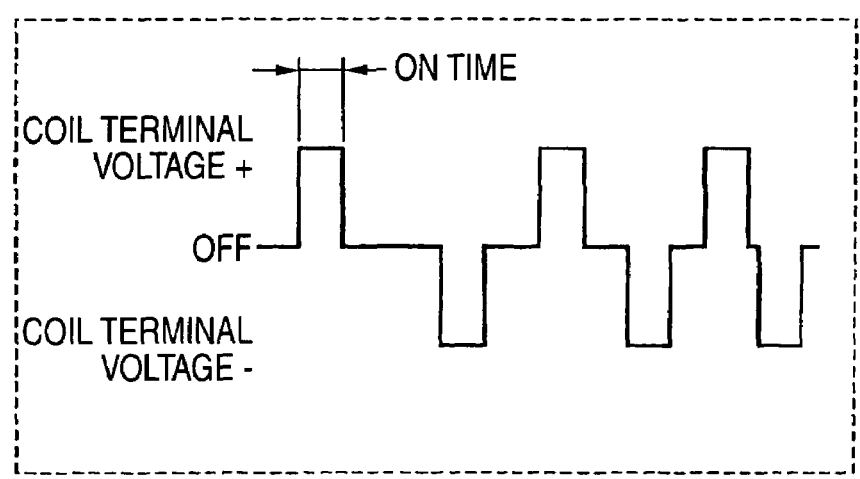
FIG. 5 is a waveform chart showing a voltage waveform for driving a stepping motor.

As shown in FIG. 3, a drive circuit 11 uses two dry cells 15 as a power source, for example, and subjects a clock signal output from an oscillation circuit 12 containing a quartz oscillator to frequency division and waveform shaping in a control unit 13, sends a drive control signal to each gate of CMOSFET 14 comprising four CMOS transistors and applies a driving voltage with an alternating pulse waveform periodically inverted across the terminals of the coil 7 as shown in FIG. 4 so as to drive the single-phase stepping motor at a constant rotation rate. According to this embodiment of the invention, ON time of the driving voltage is 20 ms, for example, and the number of revolutions of the motor is 480 rpm.

Although FIG. 4 shows an example of a case where a pulse frequency is set constant from the starting time, a slow-up function is added whereby to gradually raise the number of revolutions of the stepping motor from the starting time up to the steady operation by setting the pulse frequency at the time of starting lower than the pulse frequency during the steady operation, so that the action of the coupling mechanism for driving the impeller having the large moment of inertia to rotate at low current can be promoted further.

The coil resistance of the single-phase stepping motor according to this embodiment of the invention is several hundreds of ohms, which is considerably higher than the coil resistance of any ordinary stepping motor and resistors with hundreds of ohms may be connected in series, thus making the driving current several milliamperes. According to the embodiment of the invention, the electrical constant of the stator (coil) is set so that the mean value of the current applied to the coil is 10 mA or smaller.

As a general-purpose timepiece IC is usable as the drive circuit 11, use of dry cells that are inexpensive and low in power consumption makes feasible the driving for many hours as in the case of a timepiece (since the dry cell has a capacitance of 200 mA, continuous driving for 40 days is possible with 3V deriving from two dry cells and 2 mA of power consumption, for example).

FIGS. 6A to 6E are diagrams illustrating the rotating operating of the stepping motor according to the embodiment of the invention, showing the positional relation of the stator yokes 1A and 1B to the rotor magnet 3.

In the non-excited stable position of FIG. 6A (OFF state), the magnetic poles of the rotor magnet 3 receives very small cogging torque from the magnetic poles of the stator yokes 1A and 1B and comes in such a positional relation that the direction D1 of magnetic flux generated between the stator yokes 1A and 1B crosses and deviates from the polarity direction D2 of the rotor magnet 3. The cogging torque should be as small as possible to weaken the magnetic field but not reduced to zero.

The magnetic poles of the rotor magnet 3 that are different in polarity from the magnetic poles of the stator yokes 1A and 1B are attracted by applying the current to the coil 7 (ON state) from the non-excited stable position so as to excite the stator yokes 1A and 1B, and the magnetic poles in same polarity repel each other and are balanced. Thus, the polarity of the rotor magnet 3 turns right by less than 180° from the non-excited stable position of FIG. 6A up to the electromagnetically stable position of FIG. 6B.

When applying the current to the coil 7 is stopped (OFF state), the polarity of the rotor magnet 3 slightly turns further from the electromagnetically stable position of FIG. 6B due to the action of the cogging force and turns up to the non-excited stable position of FIG. 6C inverted by 180° from the position of FIG. 6A.

An inverted pulse out of the time of current application in FIG. 6B is then output from the non-excited stable position of FIG. 6C to the coil 7 in order that inverted polarity out of the time of excitation in FIG. 6B is generated in the stator yokes 1A and 1B. Accordingly, the magnetic poles of the rotor magnet 3 different in polarity from the magnetic poles of the stator yokes 1A and 1B are attracted and the magnetic poles in same polarity repel each other to be balanced. Thus, the polarity of the rotor magnet 3 turns right by less than 180° from the non-excited stable position of FIG. 6C up to the electromagnetically stable position of FIG. 6D.

When applying the current to the coil 7 is stopped (OFF state), the polarity of the rotor magnet 3 slightly turns further from the electromagnetically stable position of FIG. 6D due to the action of the cogging force and turns up to the non-excited stable position of FIG. 6E (the position rotated by 180° from the position of FIG. 6C or the position rotated by 360° from the position of FIG. 6A) and then returns to the position of FIG. 6A whereby to complete one revolution. The rotor magnet 3 is continuously rotated hereafter by causing a similar ON-OFF pattern to be repeated.

Figure 7:
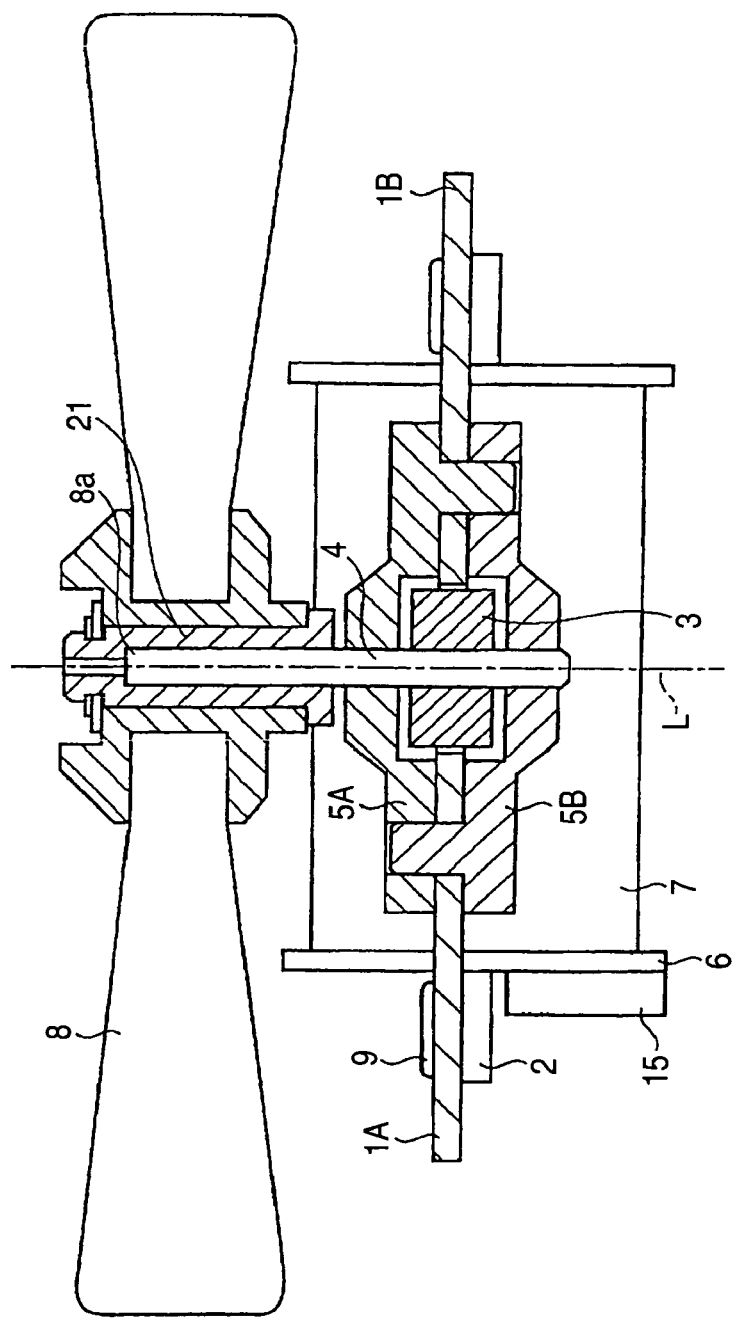
FIG. 7 is a sectional view of a single-phase stepping motor as a modified example of this embodiment according to the invention and corresponding to FIG. 2.

FIG. 7 is a sectional view of a single-phase stepping motor as a modification of the embodiment of the invention and corresponds to FIGS. 1 and 2. Hereafter, members having similar structures and functions to those of FIGS. 1 and 2 will be given similar reference numerals the description thereof will be omitted.

Although in the above embodiment of the invention the output shaft 4 and the impeller 8 are constructed so as to be attracted by the holding member 10, the impeller 8 and the output shaft 4 may be coupled slidably by a plastic friction member 21 in place of the holding member 10.

In this case, the frictional force between the output shaft 4 and the impeller 8 can be adjusted by optimizing the contact (slide) area of the friction member 21 against the output shaft 4 and the diameter of the output shaft 4, and the impeller 8 may be so arranged that the impeller is made to gradually follow the rotation of the output shaft 4 from the starting time and kept rotating during the steady operation.

As set forth above, the impeller can be driven to rotate with low current, low noise and a long life.

What is claimed is:

1. A fan motor comprising:
   a single-phase stepping motor including a stator excited by applying an electric current to a coil to function as a single-phase magnetic pole, and a rotor which has a permanent magnet magnetized to a single phase and rotates as the magnetic pole of the stator changes;
   an impeller which is rotated by a rotating shaft of the rotor;
   a drive circuit for controlling an application of a current to the coil; and
   a coupling mechanism which couples the impeller to the rotating shaft relatively and rotatably, wherein the coupling mechanism couples the impeller slidably to the rotating shaft of the rotor, causes the rotating shaft to race with respect to the impeller at a time of starting the motor, and causes the impeller to rotate by following a rotation of the rotating shaft by friction during a steady operation,
   wherein the drive circuit applies pulse voltage to the coil and the coil constant is set so that a mean value of the current applied to the coil is 10 mA or smaller.

2. The fan motor according to claim 1, wherein the drive circuit includes CMOS transistors.

3. The fan motor according to claim 1, wherein the drive circuit comprises a timepiece IC.

4. A fan motor according to claim 1 wherein a pulse frequency which is output from the drive circuit at a time of starting is set lower than the pulse frequency during a steady operation.

5. A fan motor comprising:
   a single-phase stepping motor including a stator excited by applying an electric current to a coil to function as a single-phase magnetic pole, and a rotor which has a permanent magnet magnetized to a single phase and rotates as the magnetic pole of the stator changes;
   an impeller which is rotated by a rotating shaft of the rotor;
   a drive circuit for controlling an application of a current to the coil; and
   a coupling mechanism which couples the impeller to the rotating shaft relatively and rotatably, wherein the coupling mechanism couples the impeller slidably to the rotating shaft of the rotor, includes a permanent magnet for attracting the impeller so as to contact the impeller against the rotating shaft of the rotor with a predetermined holding-down force, causes the rotating shaft to race with respect to the impeller at a time of starting the motor, and causes the impeller to rotate by following a rotation of the rotating shaft during a steady operation,
   wherein the drive circuit applies pulse voltage to the coil and the coil constant is set so that a mean value of the current applied to the coil is 10 mA or smaller.

6. The fan motor according to claim 1, wherein the stator comprises a pair of stator yokes that include thin magnetic boards.

7. The fan motor according to claim 6, wherein the pair of stator yokes comprise magnetically symmetrical L-shaped material.

8. The fan motor according to claim 1, wherein a front end portion of the rotating shaft has a spherical shape and is inserted into the impeller.

9. The fan motor according to claim 5, wherein the permanent magnet is fixed coaxially with the rotating shaft to an underside of the impeller.

10. The fan motor according to claim 2, wherein the drive circuit comprises a controller that sends drive signals to the CMOS transistors and applies a driving voltage having an alternating pulse waveform to the coil.

11. The fan motor according to claim 1, wherein the drive circuit comprises a controller that drives the single-phase stepping motor at a constant rotation rate.

12. The fan motor according to claim 1, further comprising a plastic friction member that couples the impeller and the rotating shaft.

13. The fan motor according to claim 12, wherein a frictional force between the rotating shaft and the impeller is adjustable by altering a contact portion of the friction member.

* * * * *